United States Patent
Walter et al.

(10) Patent No.: US 8,932,679 B2
(45) Date of Patent: Jan. 13, 2015

(54) METHOD FOR COATING METALLIC SURFACES WITH A MIXTURE CONTAINING AT LEAST TWO SILANES

(75) Inventors: Manfred Walter, Linsengericht (DE); Axel Schöne, Nidderau (DE); Christian Jung, Oberhaid (DE); Kevin Brown, Northampton (GB); Thomas Kolberg, Heppenheim (DE); Norbert Kliehm, Altenstadt (DE)

(73) Assignee: Chemetall GmbH (DE)

( * ) Notice: Subject to any disclaimer, the term of this patent is extended or adjusted under 35 U.S.C. 154(b) by 805 days.

(21) Appl. No.: 12/958,009

(22) Filed: Dec. 1, 2010

(65) Prior Publication Data

US 2011/0086173 A1    Apr. 14, 2011

Related U.S. Application Data

(63) Continuation of application No. 10/546,624, filed as application No. PCT/EP2004/001830 on Feb. 25, 2004, now abandoned.

(30) Foreign Application Priority Data

Feb. 25, 2003 (DE) .................... 103 08 237
Jul. 17, 2003  (DE) .................... 103 32 744

(51) Int. Cl.
| | |
|---|---|
| B05D 3/00 | (2006.01) |
| C09D 4/00 | (2006.01) |
| C09D 5/08 | (2006.01) |
| C23C 22/50 | (2006.01) |
| C23C 22/53 | (2006.01) |
| C23C 22/60 | (2006.01) |
| C23C 22/68 | (2006.01) |
| C23C 22/74 | (2006.01) |
| C23C 22/83 | (2006.01) |

(52) U.S. Cl.
CPC .. *C09D 4/00* (2013.01); *C09D 5/08* (2013.01); *C23C 22/50* (2013.01); *C23C 22/53* (2013.01); *C23C 22/60* (2013.01); *C23C 22/68* (2013.01); *C23C 22/74* (2013.01); *C23C 22/83* (2013.01); *C23C 2222/20* (2013.01); *Y02T 50/67* (2013.01)
USPC ....................... 427/397.7

(58) Field of Classification Search
None
See application file for complete search history.

(56) References Cited

U.S. PATENT DOCUMENTS

| | | | |
|---|---|---|---|
| 5,053,081 A * | 10/1991 | Jacob ........................ | 106/287.11 |
| 5,324,545 A | 6/1994 | Flamme et al. | |
| 5,393,611 A | 2/1995 | Flamme et al. | |
| 5,451,431 A | 9/1995 | Purnell et al. | |
| 5,739,369 A | 4/1998 | Matsumura et al. | |
| 6,203,854 B1 | 3/2001 | Affinito | |
| 6,478,886 B1 | 11/2002 | Kunz et al. | |
| 6,844,383 B2 | 1/2005 | Hoshi et al. | |
| 6,875,479 B2 * | 4/2005 | Jung et al. ..................... | 427/493 |
| 2001/0031811 A1 * | 10/2001 | Li et al. ........................ | 524/262 |

FOREIGN PATENT DOCUMENTS

| | | |
|---|---|---|
| CA | 1211406 | 9/1986 |
| DE | 31 51 115 A | 9/1982 |
| DE | 41 38 218 A1 | 5/1993 |
| DE | 198 14 605 A1 | 10/1999 |
| DE | 101 49 148 | 5/2002 |
| EP | 0 676 420 B1 | 10/1995 |
| EP | 0 824 127 A2 | 2/1998 |
| EP | 1 130 132 A | 9/2001 |
| JP | 2001-311037 | 11/2001 |
| WO | WO 00/46310 A | 8/2000 |
| WO | WO 01/90207 A | 11/2001 |
| WO | WO 01/90267 A2 | 11/2001 |
| WO | WO 02/31062 A | 4/2002 |

\* cited by examiner

*Primary Examiner* — William Phillip Fletcher, III
(74) *Attorney, Agent, or Firm* — Fulbright & Jaworski LLP

(57) ABSTRACT

A method for coating a metallic surface with an aqueous composition for pretreating before applying another coating or for treating said metallic surfaces. The method is characterized in that the composition contains, in addition to water; a) at least one hydrolyzable or at least partially hydrolyzed fluorine-free silane, and; b) at least one hydrolyzable or at least partially hydrolyzed fluorine-containing silane. The invention also relates to corresponding compositions.

50 Claims, No Drawings

METHOD FOR COATING METALLIC SURFACES WITH A MIXTURE CONTAINING AT LEAST TWO SILANES

This application is a continuation application of U.S. Ser. No. 10/546,624 filed Nov. 1, 2005, incorporated by reference in its entirety, which is a U.S. National Phase of PCT/EP2004/001830 filed Feb. 25, 2004, and claims priority from German Patent Application 103 08 237.9 filed Feb. 25, 2003 and German Patent Application 103 32 744.4 filed Jul. 17, 2003.

The invention relates to a process for coating metallic surfaces with an aqueous composition comprising at least one fluorine-free silane and at least one fluorine-containing silane and, if desired, organic film formers and/or further components. The invention further relates to such aqueous compositions and also to the use of the substrates coated by the process of the invention.

The processes employed most frequently to date for the surface treatment or pretreatment prior to coating of metals, particularly of metal strip, are based on the use of chromium (VI) compounds together with a variety of additives. In view of the toxicological and environmental risks associated with such processes and in view, moreover, of the foreseeable statutory restrictions governing the application of processes involving chromate, the search has been on for some time for alternatives to these processes across all fields of metal surface treatment.

The use of silanes in aqueous compositions for producing siloxane-rich corrosion-protective coatings is known in principle. Although these coatings have become established, the processes for coating with an aqueous composition predominantly comprising silane are in some cases difficult to implement. This coating is not always formed with ideal properties. In addition there may be problems in the ability sufficiently to characterize the very thin, transparent silane coatings on the metallic substrate, and defects therein, with the naked eye or with optical aids. Corrosion protection and film adhesion of the siloxane-rich coatings formed are often high, though not always so, and in some cases are not high enough for certain applications even when the coatings are appropriately applied.

In the context of the design of silane-containing aqueous compositions, moreover, it has been found appropriate to add a small or large amount of at least one component selected from the group consisting of monomers, oligomers and polymers. With compositions of this kind the nature and amount of the silane added are sometimes critical to a successful outcome. Normally, however, the amounts of silane added for the purpose are comparatively low—often only up to 5% by weight—and in that case act as a coupling agent, where the intention is that it is the adhesion-promoting (coupling) effect in particular between the metallic substrate and coating material and, where appropriate, between pigment and organic coating-material constituents that should prevail, although to a minor extent in some cases there may also be a slight crosslinking effect. Additions of silane are made predominantly to thermally curable resin systems.

Also known, furthermore, are resin mixtures in which resins are blended with inorganic acids in order thereby to obtain a pickling attack and hence improved contact of the resin film directly with the metallic surface. These compositions have the drawback that contamination occurs owing to the pickling attack while the treatment liquid (dispersion) is being contacted with the substrate. This contamination leads to the accumulation of metals in the treatment liquid and consequently to a permanent change in the chemical composition of the treatment liquid, thereby significantly impairing the corrosion protection. These metals are leached by the pickling attack from the metallic surface of the substrates to be treated.

WO 00/46310 teaches a process for coating metallic surfaces with a liquid composition which comprises a hydrolyzed aminosilane and a hydrolyzed multi-silyl-functional silane, but no fluorine-containing silane.

DE-A1-101 49 148 describes aqueous coating compositions based on organic film former, fine inorganic particles and also lubricants and/or organic corrosion inhibitor, the compositions providing outstanding results in corrosion resistance, adhesion and formability, not least on Galvalume® steel sheets, despite the absence of chromium compounds, but nevertheless also exhibiting inadequate corrosion resistance as an organic film approximately 1 μm thick on hot-dip-galvanized, electrolytically galvanized or Galfan®-coated metallic strips, i.e. on metallic surfaces which are difficult to protect against corrosion. The compositions, their constituents and the properties of the raw materials and coatings in that publication are expressly incorporated by reference into this specification.

The subject matter of German patent application DE 103 08 237 of 25 Feb. 2003, relating to compositions of similar constitution and to corresponding processes for coating metallic surfaces, is explicitly incorporated by reference in terms of the raw materials and their properties, the preparation of the compositions and/or the hydrolyzing of the silanes, the compositions such as concentrates and baths and their properties, the effects, the formation of the coatings such as the drying, filming and curing, for example, the compositions and the properties of the coatings formed, and also the variants of the processes.

It is an object of the invention to overcome the drawbacks of the prior art and in particular to propose a process for coating metallic surfaces which is suitable for coating parts and for coating metallic strips at high coating speeds, which can be employed substantially or entirely free from chromium (VI) compounds, and which is extremely easy to employ industrially.

It has surprisingly been found that the addition even of a comparatively small amount of a fluorine-containing silane to an aqueous composition allows coatings to be produced which are much more hydrophobic and corrosion-resistant than comparable coatings without the addition of fluorine-containing silane, without thereby substantially impairing the water-solubility of the composition or its stability. Normally the expectation would be that the more hydrophobic composition would also lead to a distinct deterioration in water-solubility.

The object is achieved with a process for coating a metallic surface, in particular of aluminum, iron, copper, magnesium, nickel, titanium, tin, zinc or alloys containing aluminum, iron, copper, magnesium, nickel, titanium, tin and/or zinc, with an aqueous composition, also comprising, if desired, organic solvent and other components, which is substantially or entirely free from chromium (VI) compounds, for the purpose of pretreatment prior to a further coating or for treatment, where the article to be coated—in particular a strip or strip section—is, if desired, formed after coating, which process is characterized in that the composition comprises, besides water, a) at least one hydrolyzable and/or at least partly hydrolyzed fluorine-free silane and b) at least one hydrolyzable and/or at least partly hydrolyzed fluorine-containing silane, the silanes in the composition being water-soluble or becoming water-soluble in particular by virtue of (further) hydrolysis reactions and/or chemical reactions prior to application to the metallic surface,
the clean, pickled, cleaned and/or pretreated metallic surface being contacted with the aqueous composition and a film being formed on the metallic surface and subsequently dried and, if desired, additionally cured,
the dried and, where appropriate, also cured film having a thickness in the range from 0.001 to 10 μm, determined by detaching a defined area of the cured film and weighing it or by determining the silicon content of the coating by X-ray fluorescence analysis, for example, and converting accordingly.

The object is also achieved by aqueous compositions corresponding to claim 26.

The dependent claims develop the process further. Uses can be found in claim 27 and claim 28.

The silane is characterized in this specification by the dominant constituent of the products, which are generally available commercially. The silanes present in the aqueous composition (concentrate or bath) are monomers, oligomers, polymers, copolymers and/or reaction products with further components as a result of hydrolysis reactions, condensation reactions and/or further reactions. The reactions take place primarily in solution, in the course of the drying and, where appropriate, curing of the coating. The term "silane" is utilized in this context for silanes, silanols, siloxanes, polysiloxanes and their reaction products and/or derivatives, which are often "silane" mixtures. In view of the often highly complex chemical reactions which occur in this context, and in view of highly complex analyses and operations, it is not possible to specify the particular further silanes and other reaction products.

The silanes for the purposes of this specification are regarded as being water-soluble if they summarily at room temperature in the silane composition have a solubility in water of at least 0.05 g/l, preferably at least 0.1 g/l, more preferably at least 0.2 g/l or at least 0.3 g/l. This does not imply that every single one of these silanes must have this minimum solubility but rather that these minimum values are achieved on average.

In the aqueous composition preferably there is at least one silane selected from the fluorine-free silanes: from in each case at least one acyloxysilane, alkoxysilane, silane having at least one amino group such as an aminoalkylsilane, silane having at least one succinic acid group and/or succinic anhydride group, bis-silyl-silane, silane having at least one epoxy group such as a glycidyloxysilane, (meth)acrylato-silane, multi-silyl-silane, ureidosilane, vinylsilane and/or at least one silanol and/or at least one siloxane or polysiloxane whose composition corresponds chemically to that of the aforementioned silanes. It comprises at least one silane and/or (in each case) at least one monomeric, dimeric, oligomeric and/or polymeric silanol and/or (in each case) at least one monomeric, dimeric, oligomeric and/or polymeric siloxane, the term "oligomers" being intended here to embrace even trimers.

In particular therein there is at least one fluorine-free silane selected from the group consisting of, or based on,
glycidyloxyalkyltrialkoxysilane,
methacryloyloxyalkyltrialkoxysilane,
(trialkoxysilyl)alkylsuccinoylsilane,
aminoalkylaminoalkylalkyldialkoxysilane,
(epoxycycloalkyl)alkyltrialkoxysilane,
bis(trialkoxysilylalkyl)amine,
bis(trialkoxysilyl)ethane,
(epoxyalkyl)trialkoxysilane,
aminoalkyltrialkoxysilane,
ureidoalkyltrialkoxysilane,
N-(trialkoxysilylalkyl)alkylenediamine,
N-(aminoalkyl)aminoalkyltrialkoxysilane
N-(trialkoxysilylalkyl)dialkylenetriamine,
poly(aminoalkyl)alkyldialkoxysilane,
tris(trialkoxysilyl)alkyl isocyanurate,
ureidoalkyltrialkoxysilane and
acetoxysilane.

With particular preference therein there is at least one silane selected from the group consisting of, or based on,
3-glycidyloxypropyltriethoxysilane,
3-glycidyloxypropyltrimethoxysilane,
3-methacryloyloxypropyltriethoxysilane,
3-methacryloyloxypropyltrimethoxysilane,
3-(triethoxysilyl)propylsuccinoylsilane,
aminoethylaminopropylmethyldiethoxysilane,
aminoethylaminopropylmethyldimethoxysilane,
beta-(3,4-epoxycyclohexyl)ethyltriethoxysilane,
beta-(3,4-epoxycyclohexyl)ethyltrimethoxysilane,
beta-(3,4-epoxycyclohexyl)methyltriethoxysilane,
beta-(3,4-epoxycyclohexyl)methyltrimethoxysilane,
gamma-(3,4-epoxycyclohexyl)propyltriethoxysilane,
gamma-(3,4-epoxycyclohexyl)propyltrimethoxysilane,
bis(triethoxysilylpropyl)amine,
bis(trimethoxysilylpropyl)amine,
(3,4-epoxybutyl)triethoxysilane,
(3,4-epoxybutyl)trimethoxysilane,
gamma-aminopropyltriethoxysilane,
gamma-aminopropyltrimethoxysilane,
gamma-ureidopropyltrialkoxysilane,
N-(3-(trimethoxysilyl)propyl)ethylenediamine,
N-beta-(aminoethyl)-gamma-aminopropyltriethoxysilane,
N-beta-(aminoethyl)-gamma-aminopropyltrimethoxysilane,
N-(gamma-triethoxysilylpropyl)diethylenetriamine,
N-(gamma-trimethoxysilylpropyl)diethylenetriamine,
N-(gamma-triethoxysilylpropyl)dimethylenetriamine,
N-(gamma-trimethoxysilylpropyl)dimethylenetriamine,
poly(aminoalkyl)ethyldialkoxysilane,
poly(aminoalkyl)methyldialkoxysilane,
tris(3-(triethoxysilyl)propyl)isocyanurate,
tris(3-(trimethoxysilyl)propyl)isocyanurate and
vinyltriacetoxysilane.

Preferably in the aqueous composition there is at least one silane selected from the fluorine-containing silanes: from in each case at least one acyloxysilane, alkoxysilane, silane having at least one amino group such as an aminoalkylsilane, silane having at least one succinic acid group and/or succinic anhydride group, bis-silyl-silane, silane having at least one epoxy group such as a glycidyloxysilane, (meth)acrylato-silane, multi-silyl-silane, ureidosilane, vinylsilane and/or at least one silanol and/or at least one siloxane or polysiloxane whose composition corresponds chemically to that of the aforementioned silanes, containing in each case at least one group that contains one, or contains at least one, fluorine atom.

In particular the aqueous composition comprises at least one fluoroalkoxyalkylsilane, at least one mono-, di- or tri-functional fluorosilane, at least one mono-, bis- or tris-fluorosilane, at least one fluoro-silane based on ethoxysilane and/or based on methoxysilane and/or at least one fluorosilane having at least one functional group such as, for example, an amino group, in particular in the form of a cocondensate, such as, for example, a fluoroalkyldialkoxysilane, a fluoroaminoalkylpropyltrialkoxysilane, a fluoromethanesulfonate, a fluoropropylalkyldialkoxysilane, a triphenylfluorosilane, a trialkoxyfluorosilane, a trialkylfluorosilane and/or a tridecafluorooctyltrialkoxysilane.

With particular preference the composition comprises at least one silane that contains at least two amino groups and also at least one ethyl group and/or at least one methyl group.

The amount of all silanes a) and b), including any reaction products formed with other components, is together preferably from 0.01 to 100 g/l in a concentrate or from 0.002 to 12 g/l in a bath. In the case of a concentrate this amount is more preferably in the range from 0.05 to 80 g/l, very preferably in the range from 0.1 to 60 g/l, in particular roughly 0.5, 1, 2, 3, 4, 5, 6, 7, 8, 9, 10, 11, 12, 13, 14, 15, 16, 17, 18, 20, 22.5, 25, 27.5, 30, 35, 40, 45, 50 or 55 g/l. In the case of a bath this amount is more preferably in the range from 0.005 to 5 g/l, very preferably in the range from 0.01 to 3 g/l, in particular roughly 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 2.0, 2.25, 2.5 or 2.75 g/l. Dilution of the concentrate, which is normally carried out with water and only occasionally with a mixture of water and at least one organic solvent, can be carried out in particular by a factor of from 1.5 to 30, frequently by a factor of from 2 to 20, in particular by a factor of from 3 to 12.

The proportion of a) to b) is preferably in each case in the range from 1:0.01 to 1:4, more preferably in a proportion of from 1:0.03 to 1:3, very preferably in a proportion of from 1:0.05 to 1:2.5 and in particular is in each case at least 1:0.08, 1:0.12, 1:0.16, 1:0.2, 1:0.25, 1:0.3, 1:0.35, 1:0.4, 1:0.45 or 1:0.5 or in particular in each case up to 1:2.5, 1:2.2, 1:2, 1:1.8, 1:1.6, 1:1.4, 1:1.2, 1:1.1, 1:1, 1:0.9, 1:0.8, 1:0.7 or 1:0.6. The particular optimum of this proportion may fluctuate, however, according to which silanes a) and b) are used and how they are hydrolyzed.

Preferably an aqueous composition is selected on the criteria that more than 60% by weight, in particular more than 80% by weight of the silanes have good water-solubility and that the composition prepared therewith in the form of a concentrate or bath possesses good stability for the time of processing. This processing time may vary between 2 hours and 6 months according to requirements. Good stability here means that the composition undergoes only slight precipitation, if any at all, and only slight chemical and/or physical change, if any at all. The composition composed essentially of silanes and solvents is preferably clear. In this context it is preferred to select those silanes and those reactions and process steps such that the compounds formed from the silanes in such reactions/steps adopt structures which can be regarded as ladder structures to a relatively large extent, in particular predominantly or even extensively.

It can be particularly preferable to add at least two different fluorine-free silanes, possibly even three or four different fluorine-free silanes, to the aqueous composition. Among the many possible combinations it is particularly preferred to use a combination of at least one functional trialkoxysilane and at least one bis-trialkoxysilane, of at least one aminosilane and at least one bis-trialkoxysilane, of at least one bis-trialkoxysilane and of at least one vinylsilane, of at least one bis-trialkoxysilane and of at least one ureidosilane, of at least one vinylsilane and of at least one bis-trialkoxysilylpropylsilane, of at least one aminoalkylsilane and of at least one bis-trialkoxysilylpropylsilane, of at least one bis-trialkoxysilylpropyltetrasulfane and of at least one bis-trialkoxysilylpropylsilane, of at least one fluorine-free silane containing cyanato and/or epoxy groups with a fluorine-free silane different therefrom, with the addition if desired of additionally at least one ureidosilane, at least one multi-silyl-silane, at least one bis-trialk-oxysilylpropyltetrasulfane and/or at least one further trialkoxysilane to one of these combinations.

It can also be particularly preferred to add at least two different fluorine-containing silanes, possibly even three or four different fluorine-containing silanes, to the aqueous composition.

Particular preference is given to a combination of in each case at least one organosilane, one organofunctional silane and one fluoro-silane, in particular of in each case at least one aminosilane, one multi-silyl-silane and one fluoro-silane.

It may be advantageous to hydrolyze the individual silanes, where they are not already sufficiently hydrolyzed, only individually, to store them individually where appropriate and then to add them to the composition. Chemical reactions or condensation reactions may also take place during the time of hydrolysis. Even after that time, however, it is possible for the hydrolysis and/or the chemical reactions or condensation reactions to proceed further, where appropriate in the course of storage, but in some cases even following addition to the composition in the concentrate or bath.

The aqueous composition, which in this specification is referred to as a solution, need not be a solution in the strict sense, especially since it is often possible only by means of additional analyses to determine whether the solutions in question are true solutions. In particular the aqueous composition may also be a suspension and/or emulsion, especially when particles, particularly inorganic particles, are added.

The aqueous composition comprises as solvent at least water, the water content in the solvent mixture being more than 50% by weight in the case of a concentrate and more than 75% by weight in the case of a bath composition. The amount of water in the solvent mixture in the case of a concentrate is preferably at least 60% by weight, more preferably at least 70% by weight, very preferably at least 80% by weight, in particular at least 90% by weight. The amount of water in the solvent mixture in the case of a bath composition is preferably at least 80% by weight, more preferably at least 85% by weight, very preferably at least 90% by weight, in particular at least 95% by weight. The amount of further solvents other than water, in other words particularly of organic solvents such as ethanol, methanol, propanol and/or isopropanol, for example, may on the one hand be added to the concentrate or to the bath and/or may be formed in the concentrate or bath by chemical reactions. For reasons of environmental protection, however, it is preferred that the content of organic solvents be kept as low as possible. For process engineering reasons a certain organic solvent content or low organic solvent content is sometimes preferred, but in some cases, owing to chemical reactions, it is unavoidable unless the organic solvent is removed artificially afterwards.

The aqueous composition contains not more than 0.2 g/l chromium, preferably not more than 0.1 g/l chromium, more preferably not more than 0.02 g/l chromium, the chromium content possibly originating in particular from entrainments and/or from etching operations on chromium-containing alloys and/or chrome plating. Preferably there are also no contents of further heavy metals, besides iron, manganese and zinc, that total more than 0.8 g/l.

In a first particularly preferred variant of this invention the aqueous composition comprises the silanes a) and b), water and, if desired, at least one organic solvent such as methanol, ethanol, isopropanol and/or propanol, for example, at least one alkaline agent such as ammonia, for example, at least one acidic agent such as acetic acid and/or glacial acetic acid, for example, at least one surfactant to reduce the surface tension and for uniformly and reliably coating the metallic surface, such as at least one nonionic, at least one anionic, at least one cationic and/or at least one amphoteric surfactant, for example, and/or at least one additive such as at least one preservative and/or at least one biocide, for example.

The bath compositions of the aqueous compositions predominantly comprising silanes preferably have a water content in the range from 80 to 99.9% by weight, more preferably in the range from 90 to 99.8% by weight, very preferably in the range from 94 to 99.7% by weight, particularly in the range from 96 to 99.6% by weight, in particular about 91, 91.5, 92, 92.5, 93, 93.5, 94, 94.5, 95, 95.5, 96, 96.5, 97, 97.5, 97.9, 98.2, 98.5, 98.8, 99.1 or 99.4% by weight.

The amounts of further components besides silanes and solvents in the bath are normally not more than 5 g/l in total, preferably not more than 3 g/l in total, more preferably not more than 1.5 g/l, but in the concentrate may be higher accordingly.

In a second and a third particularly preferred variant of this invention at least one component selected from the eleven components below is added additionally to the compositions of the first particularly preferred variant:
c) metal chelate,
d) monomer, oligomer, polymer and/or copolymer,
e) selected from at least one of the following components
   $e_1$) at least one inorganic compound in particle form, having an average particle diameter, measured on a scanning electron microscope, in the range from 0.005 to 0.3 μm in diameter,
   $e_2$) at least one lubricant,
   $e_3$) at least one organic corrosion inhibitor,
   $e_4$) at least one anti-corrosion pigment,
   $e_5$) at least one agent for neutralizing and/or sterically stabilizing the synthetic resins,
   $e_6$) at least one organic solvent,
   $e_7$) at least one siloxane,
   $e_8$) at least one long-chain alcohol, and
   $e_9$) at least one surfactant.

Particular preference is given to amounts of chelate(s), in each case including the resultant reaction products, of from 0.01 to 15% by weight, based on the solids content of the bath composition, more preferably, in each case independently of one another, amounts of from 0.03 to 11% by weight, in particular roughly amounts, independently of one another in each case, of 0.05, 0.1, 0.5, 1, 1.5, 2, 2.5, 3, 3.5, 4, 4.5, 5, 5.5, 6, 6.5, 7, 7.5, 8, 8.5, 9, 9.5, 10 or 10.5% by weight.

Preferably at least one silane is selected that is compatible with water, i.e. such that the at least one silane and/or, where appropriate, its hydrolysis and condensation products are miscible with the components of the aqueous composition, without disruption, and have a keeping duration of at least several weeks, and that it allows the formation of a defect-free wet film and dry film which in particular is coherent, uniform and free from craters. Selected in particular is at least one silane which enables high corrosion resistance in particular in combination with the selected, at least one chelate.

Preferably at least one chelate is selected which behaves stably in aqueous dispersions in the presence of the other components of the aqueous composition for a number of days or weeks and which enables a high corrosion resistance. In addition it is advantageous if not only the at least one silane but also the at least one chelate are able to attach chemically to the envisaged metal surface that is to be contacted therewith and where appropriate are likewise able, to attach chemically to the coating material to be applied subsequently. The at least one metal chelate is in particular one of Al, B, Ca, Fe, Hf, La, Mg, Mn, Si, Ti, Y, Zn, Zr and/or at least one lanthanide such as Ce or such as a Ce-containing lanthanide mixture, selected with particular preference from the group consisting of Al, Hf, Mn, Si, Ti, Y and Zr.

The concentrates of the aqueous compositions comprising predominantly silanes and also chelate(s) and also of the part-components as a starting product of polymer-containing compositions preferably have a water content in the range from 20 to 95% by weight, in particular from 30 to 90% by weight. The concentrates preferably comprise the silanes, including the reaction products formed therefrom, in an amount in the range from 0.1 to 60% by weight, more preferably in the range from 0.2 to 45% by weight, very preferably in the range from 0.3 to 35% by weight, in particular in the range from 0.5 to 32% by weight, especially of about 0.8, 1, 2, 4, 6, 8, 10, 12, 14, 16, 18, 20, 22.5, 25, 27.5 or 30% by weight, and preferably comprise the at least one chelate, including any reaction products formed therefrom, in the range from 0.1 to 50% by weight, more preferably in the range from 0.2 to 40% by weight, very preferably in the range from 0.3 to 30% by weight, in particular in the range from 0.5 to 25% by weight, especially of about 0.75, 1, 2, 4, 6, 8, 10, 12, 14, 16, 18, 20 or 22.5% by weight.

The bath compositions of the aqueous compositions comprising predominantly silane and chelate preferably have a water content in the range from 80 to 99.9% by weight, which may also include a fraction of at least one organic solvent. The amount of water and/or at least one organic solvent is preferably in the range from 90 to 99.8% by weight, more preferably in the range from 94 to 99.7% by weight, in particular in the range from 96 to 99.6% by weight, especially of about 95, 95.5, 96, 96.5, 97, 97.5, 97.9, 98.2, 98.5, 98.8, 99.1 or 99.4% by weight.

The bath compositions preferably comprise the silanes, including any reaction products formed therefrom with other components, in an amount in the range from 0.01 to 10% by weight, more preferably in the range from 0.05 to 7% by weight, very preferably in the range from 0.1 to 5% by weight, in particular in the range from 0.2 to 4% by weight, especially of about 0.4, 0.6, 0.8, 1.0, 1.1, 1.2, 1.3, 1.4, 1.5, 1.6, 1.7, 1.8, 1.9, 2.0, 2.1, 2.2, 2.4, 2.6, 2.8, 3.0, 3.2, 3.4, 3.6 or 3.8% by weight, and preferably comprise the at least one chelate, including any reaction products formed therefrom, in the range from 0.01 to 10% by weight, more preferably in the range from 0.05 to 7% by weight, very preferably in the range from 0.1 to 5% by weight, in particular in the range from 0.2 to 4% by weight, especially of about 0.3, 0.4, 0.5, 0.6, 0.7, 0.8, 0.9, 1.0, 1.1, 1.2, 1.3, 1.4, 1.6, 1.8, 2.0, 2.2, 2.4, 2.6, 2.8, 3.0, 3.2, 3.4, 3.6 or 3.8% by weight.

The amounts of the silanes and of the at least one chelate, including in each case the reaction products formed therefrom, particularly those of titanium, hafnium and/or zirconium, preferably account for at least 20% by weight, in particular at least 30% by weight, more preferably at least 40%, very preferably at least 50% by weight, in particular in each case at least 60, 70, 80, 90, 94, 95, 96, 97, 98 or 99% by weight of the solids contents of this composition. With particular preference this composition is composed essentially of water, in each case at least one silane and/or reaction products thereof, at least one chelate, including any reaction products formed therefrom, and also, if desired, amounts of substances selected from the group consisting of alcohols, acids such as carboxylic acids and fatty acids such as acetic acid and/or mineral acids and other substances which influence pH, such as ammonia, and/or additives and impurities. The total amount of further compounds, including additives, besides silane and chelate is normally up to 20% by weight of the solids content of silane and chelate, preferably up to 15% by weight, more preferably up to 10% by weight, very preferably up to 5% by weight, in particular up to 1 or 2% by weight.

Although the ratio of the at least one silane, including the reaction products formed therefrom, to the at least one chelate, including any reaction products formed therefrom, can preferably be in the range from 0.8:1 to 1.2:1, it has surprisingly become clear that this ratio can also be in particular in the range from 0.2:1 to 0.5:1 or can be from 2:1 to 5:1, since there may be an optimum there in certain situations.

The pH of the bath composition can be in particular in the range from 3 to 9.5, preferably in the range from 3.5 to 9, in particular in the range from 4 to 8.8. In order to adjust the pH it is possible, among other measures, to add an amount of a weak acid or of a dilute strong acid, or an acid mixture. In particular it is possible to use at least one acid such as carboxylic acids or fatty acids such as acetic acid and/or mineral acids and other substances which influence pH, such as ammonia. The bath composition can in some cases be adjusted to pH values about 3.5 units less by addition of acid, if the chemical system withstands the chosen pH and remains stable. Preferably it is also possible to add a solvent such as an alcohol to stabilize the silane.

The coatings formed with these bath compositions typically have a film thickness in the range from 0.01 to 0.6 μm, generally from 0.015 to 0.25 μm.

As well as the silanes the inventive composition may also comprise monomers, oligomers, polymers and/or copolymers. For the purposes of this specification the term "copolymers" preferably embraces block copolymers and graft copolymers as well.

The acid number of the synthetic resins is preferably from 3 to 100, more preferably from 3 to 60 or from 4 to 50. In particular, copolymers having an acid number in the range from 3 to 50 are added to the aqueous composition. Where appropriate, the components of the organic film former that are to be added are already in partly neutralized form. The organic film former may preferably include a fraction of at least one copolymer having an acid number in the range from 3 to 80, in particular to an extent of at least 50% by weight of the synthetic resins added. Within a high acid-number range it is normally not necessary to stabilize a film former cationically, anionically and/or sterically. In the case of a low acid number, however, such stabilization is often necessary. In that case it is advantageous to use already (partly) stabilized synthetic resins and/or mixtures thereof.

The aqueous composition preferably comprises at least one synthetic resin such as organic polymer, copolymer and/or mixture thereof, in particular a synthetic resin based on acrylate, ethylene, polyester, polyurethane, silicone-polyester, epoxide, phenol, styrene, melamine-formaldehyde, urea-formaldehyde and/or vinyl. The organic film former may preferably comprise a synthetic resin mixture of at least one polymer and/or at least one copolymer, comprising, in each case independently of one another, synthetic resin based on acrylate, epoxide, ethylene, urea-formaldehyde, phenol, polyester, polyurethane, styrene, styrene-butadiene and/or vinyl. The film former may also be a cationically, anionically and/or sterically stabilized synthetic resin or polymer and/or a dispersion thereof or even a solution thereof. For the purposes of this specification the term "acrylate" includes acrylic esters, polyacrylic acid, methacrylic esters and methacrylate.

The organic film former may preferably comprise at least one component based on
acrylic-polyester-polyurethane copolymer,
acrylic-polyester-polyurethane-styrene copolymer,
acrylic ester,
acrylic ester-methacrylic ester, if desired with free acids and/or acrylonitrile,
ethylene-acrylic mixture,
ethylene-acrylic copolymer,
ethylene-acrylic-polyester copolymer,
ethylene-acrylic-polyurethane copolymer,
ethylene-acrylic-polyester-polyurethane copolymer,
ethylene-acrylic-polyester-polyurethane-styrene copolymer
ethylene-acrylic-styrene copolymer,
polyester resins having free carboxyl groups in combination with melamine-formaldehyde resins,
a synthetic resin mixture and/or copolymer based on acrylate and styrene,
a synthetic resin mixture and/or copolymer based on styrene-butadiene,
a synthetic resin mixture and/or copolymer of acrylate and epoxide,
on the basis of an acrylic-modified carboxyl-containing polyester together with melamine-formaldehyde and ethylene-acrylic copolymer,
polycarbonate-polyurethane,
polyester-polyurethane,
styrene,
styrene-vinyl acetate,
vinyl acetate,
vinyl ester and/or
vinyl ether.

The organic film former, however, may also preferably comprise as synthetic resin an amount of organic polymer, copolymer and/or mixtures thereof based on polyethyleneimine, polyvinyl alcohol, polyvinylphenol, polyvinylpyrrolidone and/or polyaspartic acid, in particular copolymers with a phosphorus-containing vinyl compound. Preferably a conductive polymer, too, is added to the aqueous composition.

In the second particularly preferred variant of the invention the weight ratio of compounds of component d)—monomers/oligomers/polymers/copolymers—to silanes in the concentrate and/or in the bath is preferably in the range from 0.1:1 to 10:1, more preferably in the range from 0.2:1 to 5:1, very preferably in the range from 0.3:1 to 3:1, and in particular is up to 2:1 or up to 1.5:1. In the case of this variant the silanes can act not only and normally only to a minor extent or not at all as a coupling agent.

In the third particularly preferred variant of the invention the weight ratio of compounds of component d)—monomers/oligomers/polymers/copolymers—to silanes in the concentrate and/or in the bath is preferably in the range from 3:1 to 200:1, more preferably in the range from 8:1 to 120:1, very preferably in the range from 12:1 to 100:1. In the case of this variant the silanes in many cases act partly, predominantly or wholly only as a coupling agent. In particular in the case of this variant it is frequently advantageous to use a long-chain alcohol $e_8$) as film-forming assistant, which during the formation of the film provides approximation or alignment of the glass transition temperatures $T_g$ or of the minimum film-formation temperatures MFFT. By this means it is possible for coatings to form which in terms of the organic substances are of particularly homogeneous construction, which has a beneficial effect on the properties of these coatings.

In one embodiment which is particularly preferred in this context it is possible to use a mixture of organic film formers in which at least one part of the film formers has a glass transition temperature $T_g$ of substantially equal and/or similar $T_g$. It is particularly preferred here for at least part of the organic film formers to have a glass transition temperature $T_g$ in the range from 10 to 70° C., very preferably in the range from 15 to 65° C., in particular in the range from 20 to 60° C.

The organic film former then preferably comprises at least one fraction of at least one polymer and/or at least one copolymer having a minimum film formation temperature MFFT in the range from −10 to +99° C., more preferably in the range from 0 to 90° C., in particular from 5° C. onward or from 10° C. onward. It is particularly preferred in this case for at least two, if not indeed all, of the organic film formers to have a minimum film formation temperature in one of these temperature ranges—provided it is possible to specify a minimum film formation temperature.

It is particularly advantageous here if all of the organic film formers form films on drying. It is particularly preferred if the aqueous composition is admixed with synthetic resins of which at least 80% by weight have thermoplastic properties, in particular at least 90% by weight.

The selection of suitable film-forming assistants in this context is not simple; often a mixture of at least two film-forming assistants is necessary. Particularly advantageous film-forming assistants are what are called long-chain alcohols, particularly those having 4 to 20 carbon atoms, such as a butanediol, a butyl glycol, a butyl diglycol, an ethylene glycol ether such as ethylene glycol monobutyl ether, ethylene glycol monoethyl ether, ethylene glycol monomethyl ether, ethyl glycol propyl ether, ethylene glycol hexyl ether, diethylene glycol methyl ether, diethylene glycol ethyl ether, diethylene glycol butyl ether, diethylene glycol hexyl ether or a polypropylene glycol ether such as propylene glycol monomethyl ether, diproplylene glycol monomethyl ether, tripropylene glycol monomethyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monopropyl ether, propylene glycol phenyl ether, trimethylpentanediol diisobutyrate, a polytetrahydrofuran, a polyetherpolyol and/or a polyesterpolyol. In contradistinction to film formation, thermally curing organic coatings normally require temperatures of at least 120° C. for crosslinking.

In a fourth particularly preferred variant of the invention appropriate measures are taken to form a hydrophobic surface which owing to the hydrophobicity and/or the surface microstructure has self-cleaning properties. In this context it is possible for the surface microstructure, through the addition of organic and/or inorganic particles, through formation of organic particles, through the appropriate process regime to obtain a microstructure such that as a result there is structuring in the nanometer and/or micrometer range. The particles which are added preferably possess to a relatively large extent a rough surface and/or a complex geometry and/or associate and/or are associated so as to form aggregates and/or agglomerates which are of complex shape or rough to a greater extent. This process may be assisted by adding particles differing in fineness: that is, particles of different average size and/or different size distribution. The coating produced in this way may preferably have a surface that has a microstructure which is at least partly such that a microstructure is superimposed on a moderately fine microstructure. This coating may be constituted on the basis of the compositions of the particularly preferred first, second or third variant.

Furthermore, there are other preferred embodiments in which, in particular, at least one component selected from $e_1$) to $e_9$) is present and if desired at least one of components c) or d) is also present, in addition, if desired, to at least one monomer/oligomer/polymer/copolymer and/or to at least one inorganic compound in particle form.

It is preferred as lubricant $e_2$) to use at least one wax selected from the group consisting of paraffins, polyethylenes and polypropylenes, in particular an oxidized wax, the amount of waxes in the aqueous composition being preferably in the range from 0.01 to 5% by weight, more preferably in the range from 0.02 to 3.5% by weight, very preferably in the range from 0.05 to 2% by weight. The melting point of the wax used as lubricant is preferably in the range from 40 to 165° C., more preferably in the range from 50 to 160° C., and in particular in the range from 120 to 150° C. It is particularly advantageous, in addition to a lubricant having a melting point in the range from 120 to 165° C., to add a lubricant having a melting point in the range from 45 to 95° C. or having a glass transition temperature in the range from −20° C. to +60° C., in particular in amounts of from 2 to 30% by weight, preferably from 5 to 20% by weight, of the total solids content. This latter lubricant may also be used with advantage alone.

It is particularly advantageous to use the wax in the form of an aqueous dispersion and/or a cationically, anionically and/or sterically stabilized dispersion, since it can then be maintained in homogeneously distributed form in the aqueous composition with ease. The at least one lubricant, which if desired may also at the same time be a forming agent, is preferably present in an amount in the range from 0.1 to 25 g/l and more preferably in an amount in the range from 1 to 15 g/l in the aqueous composition.

The aqueous composition preferably comprises at least one organic corrosion inhibitor $e_3$), based in particular on amine(s), preferably at least one alkanolamine—preferably a long-chain alkanolamine, at least one TPA-amine complex such as acid adduct-4-oxo-4-p-tolyl butyrate-4-ethylmorpholine, at least one zinc salt of aminocarboxylate, of 5-nitroisophthalic acid or of cyanic acid, at least one polymeric ammonium salt with fatty acid, at least one metal salt of a sulfonic acid such as dodecyl-naphthalenesulfonic acid, at least one amino complex and transition metal complex of toluenepropionic acid, 2-mercapto-benzothiazolyl-succinic acid and/or of at least one of their amino salts, at least one conductive polymer and/or at least one thiol, it being possible for the amount of organic corrosion inhibitors in the aqueous composition to be situated preferably in the range from 0.01 to 5% by weight, more preferably in the range from 0.02 to 3% by weight, very preferably in the range from 0.05 to 1.5% by weight.

The at least one organic corrosion inhibitor is preferably not highly volatile at room temperature. Further, it may be advantageous if it is readily soluble in water and/or readily dispersible in water, in particular at more than 20 g/l. Particular preference is given, inter alia, to alkylaminoethanols such as dimethylaminoethanol and/or complexes based on a TPA amine such as N-ethylmorpholine complex with 4-methyl-γ-oxo-benzenebutanoic acid. This corrosion inhibitor can be added in order to produce greater corrosion inhibition or to make corrosion inhibition even greater.

The aqueous composition preferably contains from 0.1 to 80 g/l of the at least one anti-corrosion pigment $e_4$). These include, in particular, various silicates based on aluminum silicates, aluminosilicates, alumino-alkaline-earth metal silicates, and alkaline-earth metal silicates. The anti-corrosion pigments preferably have an average particle diameter, measured on a scanning electron microscope, in the range from 0.01 to 0.5 μm diameter, in particular in the range from 0.02 to 0.3 μm. The various kinds of anti-corrosion pigments are known in principle. An addition of at least one of these pigments, however, does not appear fundamentally to be necessary, but makes alternative variants possible.

The agents for neutralizing and/or sterically stabilizing the acid groups of the synthetic resins with an acid number in particular in the range from 5 to 50, $e_5$), may be, inter alia, low-volatility alkanolamines and hydroxides such as sodium hydroxide and potassium hydroxide solutions, but preferably high-volatility alkanolamines, ammonia and compounds based on morpholine and alkanolamines. Their effect is that the neutralized synthetic resins become miscible with water and/or are even soluble in water in the case of an acid number of about 150 or more.

In the process of the invention it is also possible if desired to add at least one organic solvent $e_6$). As organic solvent for the organic polymers it is possible to use at least one water-miscible and/or water-soluble alcohol, a glycol ether or n-methylpyrrolidone and/or water; where a solvent mixture is used it is possible in particular to use a mixture of at least one long-chain alcohol, such as propylene glycol, an ester alcohol, a glycol ether and/or butanediol, for example, with water. In many cases, however, it is preferred to add only water without any organic solvent at all. Where organic solvent is used its amount is preferably from 0.1 to 10% by weight, in particular from 0.25 to 5% by weight, very preferably from 0.4 to 3% by weight. For strip production it is preferred to use, rather, only water and almost no organic solvents or none at all, apart possibly from small amounts of alcohol.

It may further be advantageous to add at least one wetting agent, in order to allow the wet film to be applied uniformly in its two-dimensional extent and in film thickness and also to allow it to be applied coherently and with no defects. In principle a large number of wetting agents are suitable for this purpose, preferably acrylates, silanes, polysiloxanes, and long-chain alcohols, which lower the surface tension of the aqueous composition. Particular preference is given to adding at least one polysiloxane $e_7$).

The addition of at least one surfactant $e_9$) may help to improve the wetting of the composition of the invention on a metallic surface and to improve the coating, in particular to make it more uniform. In this context a distinct improvement can be achieved in particular in the case of surfaces which are particularly rough. Suitability for this purpose is possessed by a very large number of kinds of surfactants, particularly non-ionic, cationic, amphoteric and anionic surfactants. A low level of addition in the range from 0.01 to 0.4 g/l is often sufficient.

The compositions of the invention can, furthermore, also be used as an after-rinse solution, following a prior coating operation such as, for example, a conversion coating operation. As a conversion coating it is possible, for example, to apply coatings based on at least one organic and/or inorganic acid, if desired with further adjuvants, based on a phosphating treatment, for example on the basis of iron, calcium, magnesium, manganese and/or zinc, produced on the basis of a complex fluoride-containing solution or dispersion, based on phosphonate, based on at least one silane/siloxane and/or polysiloxane and/or based on rare earth compounds, to the metallic surfaces first of all. Such solutions or after-rinse solutions may therefore be particularly suitable for bright corrosion protection, where no paint and no paint-like coatings are applied. A conversion coating based on rare earth compounds such as cerium oxide, for example, can be employed in particular on surfaces rich in Al, Mg, Ti and/or Zn.

INVENTIVE AND COMPARATIVE EXAMPLES

The examples described below are intended to illustrate the subject matter of the invention.

A) Compositions of Relatively High Silane Content:

To prepare aqueous concentrates an aqueous mixture in accordance with table 1 was prepared for the silanes which were not yet prehydrolyzed, the said mixture already containing the glacial acetic acid and ethanol, by prehydrolyzing at least one silane in acidic medium for at least three days at room temperature with stirring, where the silanes to be used were not already in prehydrolyzed form. Thereafter the silane already in prehydrolyzed form, where appropriate, was added, the system was stirred intensively and the preparation was stored at room temperature where appropriate. Thereafter the concentrates were diluted with water and, if desired, a pH modifier such as ammonia and/or glacial acetic acid was added in order to obtain treatment baths ready for use. Then in each case at least 5 sheets of cold-rolled steel (CRS) or of double-sidedly hot-dip-galvanized steel sheet were contacted by roller application and drying with the corresponding treatment liquid at 25° C. The metal sheets thus treated were dried at 90° C. PMT and then tested for their corrosion protection. The compositions and properties of the concentrates and treatment baths and also the properties of the coatings are summarized in tables 1 and 2.

Silanes A and B are fluorine-free, silane C is fluorine-containing. Silane A is an amino-functional trialkoxysilane which was hydrolyzed for only about two hours before being added to the composition. Silane B is a bis-trialkoxysilane which was hydrolyzed and stored for about three days before being added to the composition. Silane C is a water-soluble aminoalkyl-functional fluoroalkylalkoxysilane which was added to the composition only after a very long time of hydrolysis and of storage. These details characterize the constituent that is by far the most dominant in the commercially available products. The silanes present in the aqueous composition (concentrate or bath) are monomers, oligomers, polymers, copolymers and/or reaction products with further components owing to hydrolysis reactions, condensation reactions and/or other reactions. The reactions take place primarily in the solution, during drying and, where appropriate, curing of the coating. The term "silane" is used here for silanes, silanols, siloxanes, polysiloxanes and their reaction products and derivatives, which are often "silane" mixtures. All of the concentrates and baths proved to be stable for one week without changes or precipitation. No ethanol was added. Amounts of ethanol in the compositions originated only from chemical reactions.

Polymer D is a readily filming thermoplastic polymer based on ethoxylate. Polymer E is a polyethylene copolymer. The $SiO_2$ particles had an average size of approximately 200 nm. Monoethanolamine and/or ammonia were added to the bath in order to adapt the pH. Additionally, in the case of inventive/comparative examples CE 10 and IE 11 to IE 20, an amount of approximately 0.1 g/l of nonionic surfactant was added in each case. This addition of surfactant helped in more effective wetting of the cleaned metallic surface. As a result, more uniform film formation was obtained, particularly in the case of metallic surfaces of relatively complex shape or of particular roughness. Using these compositions, a coating with a dry film thickness of significantly less than 1 μm was produced.

TABLE 1

Compositions of high silane content: amounts in g/l for concentrates; remainder water

| Inventive/comparative examples | CE 1 | CE 2 | CE 3 | IE 4 | IE 5 | IE 6 | IE 7 | CE 8 | CE 9 | CE 10 | IE 11 | IE 12 | IE 13 | IE 14 | IE 15 | IE 16 | IE 17 | IE 18 | IE 19 | IE 20 |
|---|---|---|---|---|---|---|---|---|---|---|---|---|---|---|---|---|---|---|---|---|
| Organo-functional silane A | 46 | — | 46 | 23 | 46 | 59 | — | — | — | 92 | 92 | 92 | 92 | 92 | 92 | 92 | 92 | 92 | 92 | 92 |
| Organosilane B | — | 95 | 95 | 48 | 95 | 122 | — | — | — | 190 | 190 | 190 | 190 | 190 | 190 | 190 | 190 | 190 | 190 | 190 |
| F-silane C | — | — | — | 4.3 | 8.5 | 1.7 | 4.3 | 8.5 | 17 | — | 17 | 34 | 102 | 17 | 34 | 17 | 17 | 34 | 34 | 17 |
| Polymer D | — | — | — | — | — | — | — | — | — | — | — | — | — | 100 | 200 | — | — | — | 200 | 100 |
| Polymer E | — | — | — | — | — | — | — | — | — | — | — | — | — | — | — | 100 | — | — | — | — |
| SiO$_2$ particles | — | — | — | — | — | — | — | — | — | — | — | — | — | — | — | — | — | — | — | — |
| Glacial acetic acid | 0.5 | 0.8 | 1.3 | 0.7 | 1.3 | 1.3 | 0.7 | 1.3 | 2.6 | small amounts | | | added | | | | ditto | | | |
| Ethanol | 1.4 | 2.0 | 3.9 | 2.0 | 3.9 | 3.9 | 2.0 | 3.9 | 7.8 | small amounts | | | added | | | | ditto | | | |

TABLE 2

Compositions of the treatment baths and properties of the dried coatings formed; remainder water; amounts in g/l

| Inventive/comparative examples | CE 1 | CE 2 | CE 3 | IE 4 | IE 5 | IE 6 | IE 7 | CE 8 | CE 9 | CE 10 |
|---|---|---|---|---|---|---|---|---|---|---|
| Organo-functional silane A | 4.6 | — | 4.6 | 2.3 | 4.6 | 5.9 | — | — | — | 9.2 |
| Organo-silane B | — | 9.5 | 9.5 | 4.8 | 9.5 | 12.2 | — | — | — | 19.0 |
| F-silane C | — | — | — | 0.43 | 0.85 | 0.17 | 0.43 | 0.85 | 1.7 | — |
| Polymer D | — | — | — | — | — | — | — | — | — | — |
| Polymer E | — | — | — | — | — | — | — | — | — | — |
| SiO$_2$ particles | — | — | — | — | — | — | — | — | — | — |
| Glacial acetic acid | 0.05 | 0.08 | 0.13 | 0.07 | 0.13 | 0.13 | 0.07 | 0.13 | 0.26 | small amounts |
| Ethanol | 0.14 | 0.20 | 0.39 | 0.20 | 0.39 | 0.39 | 0.20 | 0.39 | 0.78 | small amounts |
| pH | 10.1 | 3.3 | 5.7 | 5.9 | 5.8 | 5.9 | 4.3 | 4.2 | 4.2 | 7.2 |
| Contact angle in ° | | | | | | | | | | |
| On steel sheets | 88 | 35 | 76 | 106* | 117 | n.m. | n.m. | 114 | n.m. | n.m. |
| On HDG sheets | 94 | 83 | 94 | 104 | 128 | n.m. | n.m. | 123 | n.m. | n.m. |
| Salts spray test: bright corrosion in R$_i$ values after | | | | | | | | | | |
| 1 h | 3 | 2 | 2.5 | 2 | <1 | 1 | n.m. | 3 | n.m. | 1.5 |
| 5 h | 5 | 5 | 5 | 4 | <3 | <3 | n.m. | 5 | n.m. | 4 |

| Inventive/comparative examples | IE 11 | IE 12 | IE 13 | IE 14 | IE 15 | IE 16 | IE 17 | IE 18 | IE 19 | IE 20 |
|---|---|---|---|---|---|---|---|---|---|---|
| Organo-functional silane A | 9.2 | 9.2 | 9.2 | 9.2 | 9.2 | 9.2 | 9.2 | 9.2 | 9.2 | 9.2 |
| Organo-silane B | 19.0 | 19.0 | 19.0 | 19.0 | 19.0 | 19.0 | 19.0 | 19.0 | 19.0 | 19.0 |
| F-silane C | 1.7 | 3.4 | 10.2 | 1.7 | 3.4 | 1.7 | 1.7 | 3.4 | 3.4 | 1.7 |
| Polymer D | — | — | — | 10 | 20 | — | — | — | 20 | 10 |
| Polymer E | — | — | — | — | — | 10 | — | — | — | — |
| SiO$_2$ particles | — | — | — | — | — | — | 0.5 | 0.5 | 0.5 | 5 |
| Glacial acetic acid | | small amounts | | added | | | | ditto | | |
| Ethanol | | small amounts | | added | | | | ditto | | |
| pH | 7.2 | 7.2 | 7.2 | 7.2 | 7.2 | 7.2 | 7.2 | 7.2 | 7.2 | 7.2 |

TABLE 2-continued

Compositions of the treatment baths and properties of the dried coatings formed; remainder water; amounts in g/l Contact angle in °

| | | | | | | | | | | |
|---|---|---|---|---|---|---|---|---|---|---|
| On steel sheets | 115 | n.m. | n.m. | n.m. | n.m. | n.m. | n.m. | n.m. | n.m. | n.m. |
| On HDG sheets | 122 | n.m. | n.m. | n.m. | n.m. | n.m. | n.m. | n.m. | n.m. | n.m. |

Salts spray test: bright corrosion in $R_i$ values after

| | | | | | | | | | | |
|---|---|---|---|---|---|---|---|---|---|---|
| 1 h | <<1 | <<1 | <<1 | 0 | 0 | <1 | <<1 | <<1 | 0 | 0 |
| 5 h | <2 | <1.5 | 1 | 1 | <1 | 2 | <2 | <1.5 | <1 | <1 |

*outlier in the case of contact angle measurements

The films formed here were transparent, uniform and coherent. In all cases apart from CE 2, they showed no coloring on steel sheet. The structure, gloss and color of the metallic surface appeared to be changed only a little as a result of the coating. The combination of two or more silanes, including a relatively small fraction of a fluorine-containing silane, gave a marked improvement in corrosion protection, even when the amount of fluorine-containing silane added was comparatively small. In this case no further coating, in other words including no primer coat or varnish coat, had been applied to the silane coating. The corrosion protection values run from 0 to 5, with 5 representing the poorest values. The selection of the systems composed of fluorine-free silanes and/or of fluorine-containing silane showed its worth, since all of these combinations gave very stable solutions.

The film thickness of the coatings produced in this way—including the kind of application, which was varied to begin with—was in the range from 0.02 to 0.16 µm, mostly in the range from 0.02 to 0.12 µm.

The contact angle was measured using a DIGIDROP Contact Angle Meter from GBX Scientific Instruments using double-distilled water over 5 measurements per sheet. The greater the contact angles, the more hydrophobic the surface. In the case of experiment CE 2, in contradistinction to the other coated sheets, the steel sheet coated showed the color of golden rust, which had an adverse effect on the contact angle. Additionally it was found that the contact angle was determined not only by the silane applied, alone, but also by the effects of the surface treatment, such as the pH, for example. It emerged, surprisingly, that in the case of these experiments an amazingly strict correlation occurred between the hydrophobicity of the coated surface, the contact angle, and the corrosion resistance of the coating system.

It was found that in many cases it is useful both to give the surface of the coating certain hydrophobic qualities—measurable from the contact angles—and to ensure that the coating has a certain thickness, in order to act as a corrosion protection barrier. The silanes here improved attachment to the metallic surface.

The coatings produced herewith are in many cases suitable for coating with powder coating material or with solvent-based paint. Water-based paint compositions, in contrast, are repelled.

B) Compositions of After-Rinse Solutions Substantially Based on Silanes:

The aqueous solutions were prepared as in the case of experiment series A), with the exceptions that the compositions were chosen in accordance with table 3 and the conversion-coated metal sheets based on the aluminum alloy AA 6063 were coated by being immersed in the bath solution for 1 minute at room temperature.

The sheets of aluminum alloy AA 6063 had been treated beforehand with a conversion coating based on cerium-rich rare earth compounds in accordance with WO-A1-01/71058.

TABLE 3

Use of silane-rich solutions as after-rinse solutions in comparison with the absence thereof or with yellow chromate coating:

| | Inventive/comparative examples | | | | |
|---|---|---|---|---|---|
| | CE 21 | IE 22 | IE 23 | IE 24 | CE 25 |
| Organo-functional silane A | — | — | 65.2 | — | — |
| Organosilane B | — | — | 134.8 | — | — |
| Organo-functional silane F | — | 20 | 20 | — | — |
| Nonfunctional silane G | — | — | — | 50 | — |
| F-silane C | — | 3.4 | 3.4 | 5.1 | — |
| Polymer D | — | — | 30 | — | — |
| Isopropanol | — | 100 | — | — | — |
| Nonionic surfactant | — | 0.5 | 0.5 | 0.5 | — |
| Glacial acetic acid | — | 5.8 | present | present | — |
| Ethanol | — | present | present | present | — |
| Monoethanol-amine | — | — | to pH 7.2 | — | — |
| Water | — | 860 | 730 | 830 | n.m. |
| pH | — | 2.5 | 7.2 | 4.5 | n.m. |
| After-rinse solution | no after-rinse | see above | see above | see above | yellow chromate coating |

Salt spray test to DIN 50021 SS for

| | | | | | |
|---|---|---|---|---|---|
| 24 h | OK | OK | OK | OK | OK |
| 96 h | 80-100% brownish black | OK | OK, but milky traces | OK | OK |

The thicknesses of the coating of the invention produced with the after-rinse solution were from 0.2 to 0.3 µm. The coatings of the invention were transparent and slightly iridescent. They were highly uniform and very greatly enhanced the corrosion resistance of the underlying conversion coating based on cerium-rich oxides. The sheets of inventive examples IE 22 to IE 24, coated inventively with an after-rinse solution, had a corrosion resistance comparable with that of a conventional yellow chromate coating, without containing environmentally harmful substances. The expectations with regard to the improvement in corrosion resistance had been fulfilled more comprehensively than expected.

The invention claimed is:

1. A process comprising pretreating a metallic surface by applying to the metallic surface an aqueous composition that is substantially or entirely free from chromium (VI) compounds to form an anticorrosive coating on the metallic surface, wherein the aqueous composition comprises water and
   a) at least one hydrolyzable or at least partly hydrolyzed fluorine-free silane; and
   b) at least one of a hydrolyzable or at least partly hydrolyzed fluorine-containing silane; and
   c) a film former comprising at least one of a monomer, oligomer, polymer or copolymer;
   wherein the ratio of component d) to silanes a) and b) in the composition range from 0.1:1 to 10:1,
   wherein the silane a) and the silane b) are water-soluble or become water-soluble in said water by hydrolysis or by chemical reaction prior to application to the metallic surface, wherein the fluorine free silane comprises at least one fluorine-free organosilane and at least one fluorine-free organofunctional silane, wherein said fluorine-containing silane comprises at least one member selected from the group consisting of an aminosilane, a ureidosilane, vinylsilane and at least one bis-trilkoxysilane;
   wherein prior to application of the aqueous compound the metallic surface is clean pickled, cleaned, pretreated or any combination thereof and subsequently drying the anticorrosive coating to form an anticorrosive dried film on said metallic surface,
   and further coating the metallic surface having the dried film thereon;
   wherein the dried anticorrosive film has a thickness in the range from 0.01 to 0.6 µm.

2. The process according to claim 1, wherein in the aqueous composition selected from the fluorine-containing silanes there is in each case at least one acyloxysilane, alkoxysilane, a silane having at least one amino group such as an aminoalkylsilane, silane having at least one succinic acid group or succinic anhydride group, bis-silyl-silane, silane having at least one epoxy group such as a glycidyloxysilane, (meth)acrylato-silane, multi-silyl-silane, ureidosilane, vinylsilane, a silanol a siloxane or a polysiloxane whose composition corresponds chemically thereto, wherein the group contains at least one fluorine atom.

3. The process according to claim 1, wherein the aqueous composition comprises at least one fluoroalkoxyalkylsilane, at least one mono-, di- or trifunctional fluorosilane, at least one mono-, bis- or tris-fluorosilane, at least one fluorosilane based on at least one of ethoxysilane, based on methoxysilane or a fluorosilane having a functional group.

4. The process according to claim 1, wherein the silane contains at least two amino groups and also at least one of an ethyl group or a methyl group.

5. The process according to claim 1, wherein the aqueous composition further comprises at least one component e) selected from the group consisting of:
   $e_1$) at least one inorganic compound in particle form, having an average particle diameter, measured on a scanning electron microscope, in the range from 0.005 to 0.3 µm in diameter;
   $e_2$) at least one lubricant;
   $e_3$) at least one organic corrosion inhibitor;
   $e_4$) at least one anti-corrosion pigment;
   $e_5$) at least one agent for neutralizing or sterically stabilizing the synthetic resins;
   $e_6$) at least one organic solvent;
   $e_7$) at least one siloxane;
   $e_8$) at least one long-chain alcohol; and
   $e_9$) at least one surfactant.

6. The process according to claim 1, wherein the organic film former is a synthetic resin mixture comprising at least one polymer or copolymer selected from the group consisting of acrylate, epoxide, ethylene, urea-formaldehyde, phenol, polyester, polyurethane, styrene, styrene-butadiene, vinyl or is based on one of the foregoing.

7. The process according to claim 1, wherein the organic film former further comprises as synthetic resin at least one organic polymer, copolymer or mixture thereof selected from the group consisting of polyethyleneimine, polyvinyl alcohol, polyvinylphenol, polyvinylpyrrolidone or polyaspartic acid or is based on one of the foregoing.

8. The process according to claim 1, wherein acid groups of the synthetic resin are stabilized with ammonia, an amine an alkali metal compound.

9. The process according to claim 1, wherein the aqueous composition contains from 0.1 to 980 g/l of the organic film former.

10. The process according to claim 1, wherein the amount of at least one fluorine-free silane in the aqueous composition, including reaction products formed therefrom, is from 0.05 to 300 g/l.

11. The process according to claim 1, wherein the amount of at least one fluorine-containing silane in the aqueous composition, including the reaction products formed therefrom is from 0.01 to 150 g/l.

12. The process according to claim 1, wherein the at least one metal chelate is selected from the group consisting of chelate complexes based on acetylacetonates, acetoacetic esters, acetonates, alkylenediamines, amines, lactates, carboxylic acids, citrates or glycols, the amount of at least one chelate in the aqueous composition, including any reaction products formed therefrom, being preferably from 0.1 to 80 g/l.

13. The process according to claim 1, wherein the inorganic compound is in particle form as a finely divided powder, a dispersion, a suspension, a colloidal dispersion or amorphous particles.

14. The process according to claim 1, wherein as inorganic compound in particle form particles are added based on at least one of aluminum, of barium, of cerium, of calcium, of lanthanum, of silicon, of titanium, of yttrium, of zinc or of zirconium.

15. The process according to claim 1, wherein as lubricant at least one wax is used selected from the group consisting of paraffins, polyethylenes and polypropylenes, in particular an oxidized wax, the amount of waxes in the aqueous composition being preferably in the range from 0.01 to 5% by weight.

16. The process according to claim 1, wherein the coating is partly produced by drying and filming, or is cured by at least one of actinic radiation, cationic polymerization or thermal crosslinking.

17. The process according to claim 1, wherein the aqueous composition comprises at least one additive selected from the group consisting of a biocide, a defoamer or a wetting agent.

18. The process according to claim 1, wherein the coated metallic surface is dried at a temperature in the range from 20 to 400° C. forced-air temperature.

19. The process according to claim 1, wherein the aqueous composition is applied by rolling, flow coating, knife coating, spraying, squirting, brushing or dipping and if desired by subsequent squeezing off with a roller.

20. The process according to claim 1, wherein in each case at least one coating of printing ink, film, paint, paint-like material, powder coating material, adhesive or adhesive backing is applied to the dry and also, where appropriate, cured film.

21. The process according to claim 1, wherein the coated metal parts, strips or strip sections are formed, painted, coated with polymers such as PVC, printed, bonded, hot-soldered, welded or joined with one another or with other elements by clinching or other joining techniques.

22. The process of claim 1, wherein the composition is applied as an after rinse solution which is applied to a preceding coating.

23. The process of claim 22, wherein the preceding coating is a conversion coating, or applied for blank corrosion protection.

24. The process according to claim 23, wherein said film former comprises phosphorous containing vinyl compound.

25. The process of claim 1, wherein the functional group is an amine group.

26. The process of claim 25, wherein said amine is selected from the group consisting of morpholine, dimethylethanolamine, diethylethanolamine, and triethylanolamine.

27. The process of claim 1, wherein the film former comprises at least one of fluoroalkyldialkoxysilane, a fluoroaminoalkylpropyltrialkoxysilane, a fluoromethanesulfonate, a fluoropropylalkyldialkoxysilane, a triphenylfluorosilane, a trialkoxyfluorosilane, a trialkylfluorosilane or a tridecafluorooctyltrialkoxysilane.

28. A process according to claim 1, wherein the fluorine-containing silane is selected from the group consisting of an acyloxysilane, silane having at least one succinic acid group, a silane having at least one succinic anhydride group, bis-silyl-silane, (meth)acrylato-silane and a multi-silyl-silane.

29. A process according to claim 1, wherein the fluorine-containing silane is selected from the group consisting of an acyloxysilane, silane having at least one succinic acid group and/or succinic anhydride group, bis-silyl-silane, (meth)acrylato-silane, multi-silyl-silane or a silanol, siloxane or siloxane corresponding chemically to that of said fluorine-containing silane.

30. A process for coating a metallic surface, with an aqueous composition which is substantially or entirely free from chromium (VI) compounds, wherein the composition comprises water and
a) at least one hydrolyzable or at least partly hydrolyzed fluorine-free silane;
b) at least one hydrolyzable or at least partly hydrolyzed fluorine-containing silane, wherein said fluorine-containing silane comprises at least one member selected from the group consisting of an aminosilane, a ureidosilane, vinylsilane, and a bis-trilkoxysilane;
c) at least one metal chelate; and
d) at least one of an oligomer, polymer or copolymer;
wherein the ratio of the oligomer, the polymer or the copolymer of component d) to silanes a) and b) in the aqueous solution is in the range from 0.1:1 to 10:1,
the silanes in the composition being water-soluble or becoming water-soluble in particular by virtue of hydrolysis reactions or chemical reactions prior to application to the metallic surface,
the clean, pickled, cleaned or pretreated metallic surface being contacted with the aqueous composition and a film being formed on the metallic surface and subsequently dried and, optionally cured,
the dried and, where appropriate, also cured film having a thickness in the range from 0.001 to 10 µm;
and applying further coating the metallic substrate.

31. A process according to claim 30, wherein the fluorine-containing silane is selected from the group consisting of an acyloxysilane, silane having at least one succinic acid group and/or succinic anhydride group, bis-silyl-silane, (meth)acrylato-silane, multi-silyl-silane or a silanol, siloxane or siloxane corresponding chemically to that of said fluorine-containing silane.

32. A process according to one of claim 30, wherein the fluorine-free silane contains at least two amino groups.

33. A process according to claim 30, wherein aqueous further comprises at least one component e) selected from the group consisting of:
$e_1$) at least one inorganic compound in particle form, having an average particle diameter, measured on a scanning electron microscope, in the range from 0.005 to 0.3 µm in diameter,
$e_2$) at least one lubricant,
$e_3$) at least one organic corrosion inhibitor,
$e_4$) at least one anti-corrosion pigment,
$e_5$) at least one agent for neutralizing or sterically stabilizing the synthetic resins,
$e_6$) at least one organic solvent,
$e_7$) at least one siloxane,
$e_8$) at least one long-chain alcohol, and
$e_9$) at least one surfactant.

34. A process according to claim 30, wherein the organic film former is a synthetic resin mixture of at least one polymer or at least one copolymer, comprising synthetic resin based on acrylate, epoxide, ethylene, urea-formaldehyde, phenol, polyester, polyurethane, styrene, styrene-butadiene or vinyl.

35. A process according to claim 30, wherein the organic film former comprises at least one member selected from the group consisting of polyethyleneimine, polyvinyl alcohol, polyvinylphenol, polyvinylpyrrolidone and polyaspartic acid.

36. A process according to claim 30, wherein acid groups of the organic polymer are stabilized with ammonia, with amines such as morpholine, dimethylethanolamine, diethylethanolamine or triethanolamine or with alkali metal compounds such as sodium hydroxide.

37. A process according to claim 30, wherein the aqueous composition contains from 0.1 to 980 g/l of the organic film former, preferably from 2 to 600 g/l.

38. A process according to claim 30, wherein the amount of at least one fluorine-free silane in the aqueous composition, including the reaction products formed therefrom, is preferably from 0.05 to 300 g/l.

39. A process according to claim 30, wherein the amount of at least one fluorine-containing silane in the aqueous composition, including the reaction products formed therefrom, is preferably from 0.01 to 150 g/l.

40. A process according to claim 30, wherein the at least one metal chelate is selected from chelate complexes based on acetylacetonates, acetoacetic esters, acetonates, alkylenediamines, amines, lactates, carboxylic acids, citrates or glycols, the amount of at least one chelate in the aqueous composition, including any reaction products formed therefrom, being preferably from 0.1 to 80 g/l.

41. A process according to claim 30, wherein the inorganic compound is added to the aqueous solution in particle form a finely divided powder, a dispersion or a suspension.

42. A process according to claim 30, wherein inorganic compound in particle form particles are added based on at least one compound of aluminum, of barium, of cerium, of calcium, of lanthanum, of silicon, of titanium, of yttrium, of zinc or of zirconium.

43. A process according to claim 30, wherein the lubricant is a wax selected from the group consisting of a paraffin, a polyethylene and a polypropylene.

44. A process according to claim 30, wherein the coating is partly produced by drying and filming or is cured by actinic radiation, cationic polymerization or thermal crosslinking.

45. A process according to claim 30, wherein the aqueous composition comprises at least one additive, in particular at least one selected from the group consisting of at least one biocide, at least one defoamer or at least one wetting agent.

46. A process according to claim 30, wherein the coated metallic surface is dried at a temperature in the range from 20 to 400° C. forced-air temperature.

47. A process according to claim 30, wherein the aqueous composition is applied by rolling, flow coating, knife coating, spraying, squirting, brushing or dipping and if desired by subsequent squeezing off with a roller.

48. A process according to claim 30, wherein the further coating is selected from the group consisting of a printing ink, an additional film, a paint, a powder coating, an adhesive and an adhesive backing.

49. A process according to claim 30, wherein the coated metal parts, strips or strip sections are formed, painted, coated with polymers such as PVC, for example, printed, bonded, hot-soldered, welded or joined with one another or with other elements by clinching or other joining techniques.

50. A process according to claim 30, wherein the fluorine-containing silane is selected from the group consisting of an acyloxysilane, silane having at least one succinic acid group, a silane having at least one succinic anhydride group, bis-silyl-silane, (meth)acrylato-silane and a multi-silyl-silane.

* * * * *